Dec. 1, 1936.  H. B. COSLER  2,062,867
CANDY DECORATING METHOD
Filed Aug. 28, 1933
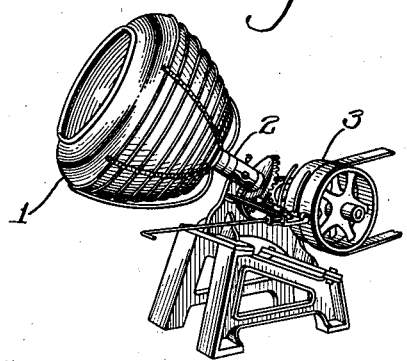
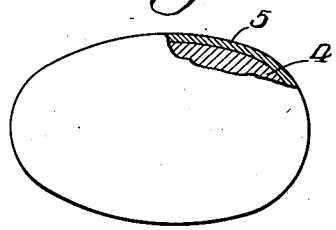
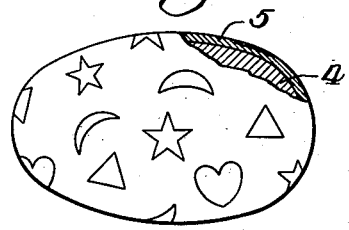
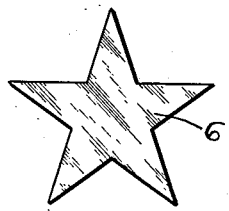
Inventor;-
Horace B. Cosler
By Ira J. Wilson Atty.

Patented Dec. 1, 1936

2,062,867

UNITED STATES PATENT OFFICE 2,062,867

CANDY DECORATING METHOD

Horace B. Cosler, Evanston, Ill., assignor to National Candy Company, Inc., St. Louis, Mo., a corporation of New Jersey Application August 28, 1933, Serial No. 687,164

3 Claims. (Cl. 107—54)

This invention pertains to the decorating of candies and like articles of food.

Much ingenuity has been exercised heretofore in applying decorations to the exterior surfaces of candies, both by hand operation methods and by machine operation processes. In general, hand decorating methods are inherently expensive while machine decorating methods though less expensive are difficult usually to achieve. The present invention aims to provide for the decorating of candies by machinery, attaining a result which would normally be thought possible of achievement only by hand.

In the drawing forming a part of this specification:

Fig. 1 is a perspective of a "pan" employed in connection with this invention,

Fig. 2 is a side elevation with a part in section of a candy egg undecorated but ready for the decoration, Fig. 3 is a side elevation partly in section showing a candy egg immediately after the decorated pieces have been applied, Fig. 4 is a partial elevation and partial section, enlarged, of a candy egg showing the decoration applied, Fig. 5 is a plan view of one of the decorative pieces, and Fig. 6 is an end view of the same piece.

The machine preferably used in accordance with this invention is the well known "pan", which may be further identified as an open tank somewhat in the shape of a kettle 1 having a shaft 2 secured to the center of its bottom, the shaft being mounted at an inclination and rotated by any suitable driving apparatus 3, usually at low speed, whereby the candies which are treated therein will tumble over one another during the rotation of the "pan". Devices of this character are at least a half a century old and are readily identified in the industry by the term "pan".

Candies which are made in pans and which may be decorated in accordance with this invention at the present time are candy eggs, candy hearts, spherical candies and many other shapes, such as bean-shaped candies. All of these are usually coated with a portion of their ultimate ingredients as they are tumbled about in the pan, though usually a rather firm center is made in another machine and the coating applied in the tumbling pan.

I have found that candy eggs, candy hearts, spherical candies and other shaped candies having a somewhat sticky coating prior to finishing may be improved greatly in appearance and made more attractive to their customers, which usually are children, by the addition on their exterior surfaces of flatly applied decorations such as small stars, crescents, circular discs, squares, triangles, diminutive sized ducks, rabbits and other animals.

These decorative pieces for application to the candies are preferably made from edible thin gelatin sheets colored with edible coloring matter, colored thin sheets of dough, or any other suitable and edible thin sheet material from which the designs may readily be cut or stamped. Paper-thin sheets are preferred, for ease of application, economy and for the reason that they amply supply the needed decoration without necessity for any additional thickness. The decorations when delivered to the candies on which they are to be applied are preferably dry, hence they may easily be sprinkled or showered upon the candies. A sticky surface on the candies is relied upon to establish adhesion of the decorations.

An example of the manner in which this invention may be performed will now be described. In the formation of sugar coated candy eggs, marshmallow preparations are first formed roughly in the shape of hens' eggs and usually smaller in size, according to the present trade practices, and a batch of perhaps one hundred pounds of these eggs is put in a revolving unheated pan. At intervals small quantities of thick syrup are poured into the pan and each charge of syrup is gradually picked up by the marshmallow centers as the pieces tumble about in the pan. When one batch has been pretty thoroughly and evenly acquired as a coating by the centers, a charge of dry granulated sugar is sprinkled upon the sticky centers, while the tumbling continues. The sugar gradually becomes coated upon the centers and when it has been completely picked up by the centers another batch of syrup followed by another charge of sugar is again added. Successive additions of syrup and sugar are made until the eggs accumulate a compact coating ranging from one-sixteenth to one-eighth of an inch in thickness. This coating process is usually termed "grossing" and is a common practice in the industry.

When sufficient coating has been acquired by the eggs and while the coating is still somewhat sticky, a handful of the decorative pieces will then be sprinkled upon the tumbling mass. It will be found that every egg in the whole batch will accumulate a number of these pieces and that they will adhere flatly to the surfaces of the eggs, being rolled and pounded flatly thereon in an irregular manner. If a number of different designs are thrown into one batch it will be found that they will be disposed on the eggs in different arrangements, perhaps more of one design on some of the eggs than will be found on others, with a result exceedingly attractive and appealing to the customers. Since the decorative pieces are themselves edible they conveniently form a part of the candy. Special flavors of sufficient strength to be noticeable may also be incorporated in these decorative pieces if desired.

After the decorations have been rolled on to the candies in this tumbling process, as above described, the candy surfaces are, of course, still sticky and at this time it is preferred to dust on to the tumbling mass a quantity of dry powdered sugar for the purpose of absorbing the surface moisture and producing dry surfaces that will not stick together. These candies may then be removed from the pan and allowed to dry, either under atmospheric conditions or by artificial drying at low temperatures. When the candies have sufficiently hardened and dried the dusty outer coating thereon may be dissolved in another pan by adding a charge of thin sugar syrup which will be allowed to dry, forming a smooth surface coating. A coating of wax is then applied in a tumbling pan to give the eggs a polished surface.

The wax coating will, of course, cover the decorations and further assist their retention.

The above described example is a "cold pan" method. The invention obviously may be employed in connection with hot pan work as will readily be understood by those skilled in this art.

Furthermore, the type of machine mentioned above, that is, the usual "pan" may be replaced by some other device which will yield the same result, that is, a tumbling action in which the candies themselves mutually assist in placing and rolling these flat decorative pieces on each other. The sizes of the decorative pieces may vary from a quarter of an inch over-all diameter to dimensions larger or smaller, depending upon the candy piece to which they are applied, it being obvious that very small candies, smaller than eggs, will not take the large decorations as well as they would take small decorative pieces. For candies the size of hens' eggs or even considerably smaller, quarter inch decorative pieces may be applied by this tumbling process with excellent results.

In the drawing for illustrative purposes a candy egg is shown having a center 4 and a layer 5 which is gradually built up by supplying a coating material to the candies being tumbled in the pan.

As may readily be appreciated by those skilled in this art, the exact composition of the center 4 and the compositon of the coating 5 will vary in accordance with the particular candy being made. However, so far as this invention is concerned it is important that the candies have a sticky coating on their outer surfaces at the time the flat decorative pieces, such as 6, 7 and 8, are applied in the pan. During the continuance of the tumbling operation these flat decorative pieces, which are preferably edible gelatin, are sprinkled upon the tumbling mass and the stickiness of the coating, whatever may be its nature, will cause the decorations to adhere and the mutual action of the candies tumbling upon one another will roll these decorations flatly and snugly upon the candy surfaces.

After the decorations are adequately attached to the candies by the tumbling action in the pan, the further preparation of the candy for marketing is then performed, generally also as pan coating operations and consisting primarily in producing a smooth non-sticky surface involving the application of thin syrups and usually a coating of wax. The manner of finally finishing the candies is, of course, subject to the usual practices demanded by the nature of the candy and is not particularly related to this invention nor affected by the presence of the decorations. In the drawing no attempt is made to illustrate the final finish as it is so extremely thin that it cannot be illustrated as a layer without misleading exaggeration.

It will therefore be understood that the invention is not limited to the precise disclosure given in the above example, but is susceptible of modification and variation within the scope of the appended claims.

Having described my invention, I claim:

1. A method of decorating candies comprising grossing the candies and while the surfaces thereof are still somewhat moist and sticky and still being tumbled in a pan delivering on to the tumbling mass a quantity of thin edible decorations and continuing the tumbling until all of the candies have acquired some of the decorations flatly adhering to their exteriors.

2. A method of decorating candies comprising supplying a moist sticky coating material to a mass of candies being tumbled over one another, thereafter adding to the tumbling mass a quantity of thin flat sheet-like decorations, continuing the tumbling until by mutual interaction of the tumbling candies the decorations are generally distributed throughout the mass and flatly rolled upon the sticky surfaces of the candies, and finally supplying a non-sticky finishing surface to the candies after application of said decorations.

3. A method of decorating articles of food comprising providing a moist sticky surface on the individual articles in a mass of articles, and while tumbling the mass of said sticky articles adding thereto a quantity of thin sheet-like decorations and continuing the tumbling until the decorations are generally distributed throughout the mass and rolled upon the surfaces of the articles.

HORACE B. COSLER.